United States Patent

[11] 3,542,174

| [72] | Inventor | Torao Hattori |
| --- | --- | --- |
| | | Kitaadachi-gun, Saitama-ken, Japan |
| [21] | Appl. No. | 804,068 |
| [22] | Filed | March 4, 1969 |
| [45] | Patented | Nov. 24, 1970 |
| [73] | Assignee | Honda Giken Kogyo Kabushiki Kaisha |
| | | Tokyo, Japan |

[54] TORQUE CONVERTER CONNECTED TO FLUID OPERATED CLUTCHES
10 Claims, 2 Drawing Figs.

[52] U.S. Cl.................................................. 192/3.26,
192/3.31, 192/103, 192/87.12
[51] Int. Cl...................................................... F16d 25/10
[50] Field of Search............................................ 192/3.26,
3.27, 3.31, 3.25

[56] References Cited
UNITED STATES PATENTS

| 2,632,539 | Black............................ | 192/3.27 |
| --- | --- | --- |
| 2,642,168 | Black et al.................... | 192/3.26 |

*Primary Examiner*—Benjamin W. Wyche, III
*Attorney*—Waters, Roditi, Schwartz & Nissen ABSTRACT: A partition is disposed as a common separation between two chambers, one for operating a direct coupling clutch between a pump and a turbine of a torque converter and the other for operating a main clutch between the turbine and an output shaft. An opening is provided in the partition to establish communication between the chambers and a valve is slidably mounted in a radial cylinder formed in the partition to control opening and closing of said opening in the partition, the valve being subject to centrifugal force related to the speed of rotation of the output shaft whereby to control flow of pressure fluid to the chamber for operating the direct coupling clutch in accordance with the speed.

Patented Nov. 24, 1970

3,542,174

INVENTOR

BY Torao Hattori

TORQUE CONVERTER CONNECTED TO FLUID OPERATED CLUTCHES

BRIEF SUMMARY OF THE INVENTION

This invention relates to an apparatus whereby a direct coupling clutch arranged for a torque converter is automatically switched to either operative or inoperative position in accordance with the speed of rotation of an output shaft.

The torque converter has a pump, a turbine and stator and there is provided a direct coupling clutch including a driving disc connected to the pump, a driven disc connected to the turbine and a fluid pressure chamber for operating said discs to bring the same into pressure contact with one another. A main clutch includes a driving disc connected to the turbine, a driven disc connected to the output shaft and a fluid pressure chamber for operating said discs to bring the same into pressure contact with one another, said two clutches being parallel to one another and including a common partition connected to the turbine, said partition being provided with an opening establishing communication between the two fluid pressure chambers and radially positioned valve means at said partition operating under centrifugal force for opening and closing said opening.

DETAILED DESCRIPTION

Figure 1:
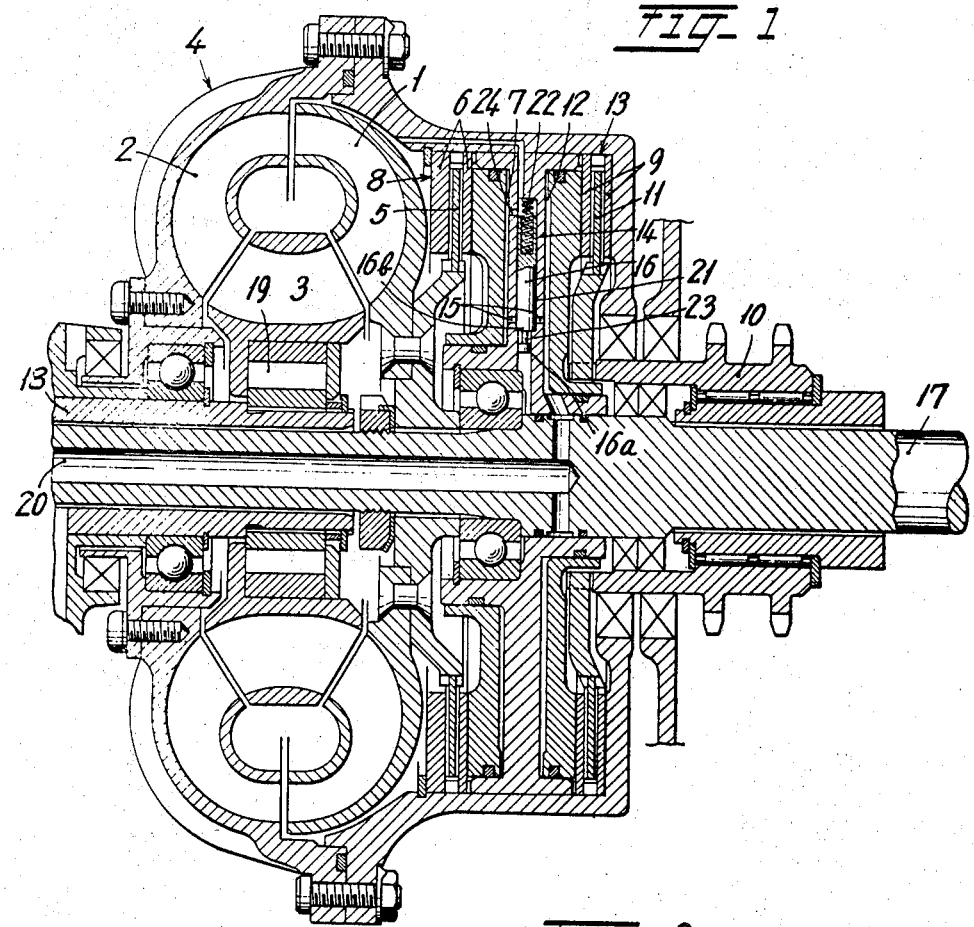
FIG. 1 is a sectional elevation view of one embodiment of this invention.
Figure 2:
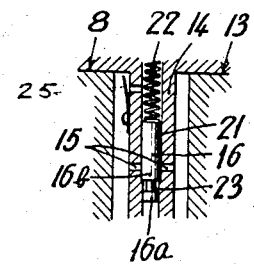
FIG. 2 is a sectional side view of a modified portion of said embodiment.

Referring to the drawing, there is provided on one side of a torque converter 4 having a pump 1, a turbine 2 and a stator 3, a direct coupling clutch 8 comprising a driving disc 5 connected to the pump 1 side, driven discs 6 connected to the turbine 2 side and an oil pressure chamber 7 for operating said discs 5 and 6 to engage in pressure contact one with another, and a main clutch 13 comprising driving discs 9 connected to the turbine 2 side, a driven disc 11 connected to an output shaft 10 and an oil pressure chamber 12 for operating said discs 9 and 11 to engage in pressure contact one with another. The two clutches 8 and 13 are parallel to one another with a common partition wall 14 therebetween connected to the turbine 2 side. The partition 14 is provided with openings 15 for establishing communication between the chambers 7 and 12, and a radially displaceable centrifugal operation valve 16 controls the opening and closing of said openings 15. Numeral 17 denotes a central input shaft connected to the pump 1 side, numeral 18 denotes a stator shaft of tubular type around the periphery of said shaft 17, numeral 19 denotes a one-way clutch interposed between the shaft 18 and the stator 3, and numeral 20 denotes a pressure fluid supply passage passing through the center of the input shaft 17. The pressure chamber 12 of main clutch 13 is ordinarily supplied with pressure fluid (generally oil) from an external pressure fluid pump (not shown) through passage 20 so that clutch 13 is in its operative condition. A valve (not shown) controls the flow of pressure fluid from the fluid pump to passage 20. The valve 16 is formed as a slidable piston mounted in a radial cylinder 21 formed in partition wall 14 and the piston is subjected to the action of a spring 22 at its rear surface. The piston is provided with a constricted portion 23 near the front thereof so that the openings 15 becomes opened when, by the centrifugal force at the time of high speed rotation, the valve is displaced against the action of spring 22 and the constricted portion 23 reaches the level of openings 15. The valve 16 is so constructed that the rear end thereof closes a discharge opening 24 of the pressure chamber 7 at the time that openings 15 are opened by valve 16. The arrangement may be modified as shown in FIG. 2 so that instead of the valve 16 closing the opening 24, there is separately provided a leaf spring 25 which tends to be displaced to a position where opening 24 is open. The spring 25 is resilient, so that at the time of pressurizing of chamber 7, the spring 25 is urged against opening 24 and the same is automatically closed. When the flow of pressure fluid to chamber 7 is interrupted, the spring 25 begins to move to its initial position due to fluid leakage after the interruption, so that the desired discharge may be effected.

The valve 16 is so constructed that the front end portion 16a beyond the constricted portion 23 is somewhat smaller in diameter than the rear end portion 16b so that the respective operating points (speeds of rotation of shaft 10) for valve opening and valve closing are differentiated to prevent any occurrence of chattering. Namely, in order to open the valve 16, the centrifugal force thereon which is a function of the speed of rotation reaches a value at which the spring 22 is overcome, but after once having opened, the pressure fluid around the constricted portion 23 gives a bias force to the larger diameter side so that the spring 22 is biased to that extent, whereby the closing of the valve cannot be obtained unless the speed is reduced to a value lower than that at which the valve is opened.

The operation of this apparatus is as follows:

If, from the condition where the pressure chamber 12 of the main clutch 13 is supplied with pressure fluid to activate clutch 13 and, accordingly, the output side of the torque converter 4 is connected to the output shaft 10, the speed of rotation of shaft 10 is gradually increased, the valve 16 opens as a predetermined speed is reached, so that the pressure fluid within the chamber 12 flows into the chamber 7 of the direct coupling clutch 8 through the openings 15, whereby the clutch 8 also is made operative and the torque convertor 4 comes into direct coupling operation.

If the speed of rotation is then lowered, the valve 16 is closed to release the direct coupling clutch 8, so that the torque converter 4 returns to its initial operation.

Thus, according to this invention, the direct coupling clutch can be rendered operative or inoperative entirely automatically depending on the speed of rotation of the output shaft, and furthermore since the supply of pressure fluid to the direct coupling clutch 8 is effected from the main clutch 13 through the centrifugally operating valve 16 interposed between clutches 8 and 13, the construction becomes simple and the manufacture economical in comparison with the type wherein the two clutches 8 and 13 are provided with respective fluid supply passages.

I claim:

1. Apparatus for control of a torque converter driving an output shaft, said torque converter having a pump, a turbine and a stator, said apparatus comprising a direct coupling clutch including a driving disc connected to the pump, a driven disc connected to the turbine and a fluid pressure chamber for operating said discs to bring the same into pressure contact with one another, a main clutch including a driving disc connected to the turbine, a driven disc connected to the output shaft and a fluid pressure chamber for operating said discs to bring the same into pressure contact with one another, said two clutches including a common partition connected to the turbine, said partition being provided with an opening establishing communication between the two fluid pressure chambers and radially positioned valve means at said partition operating under centrifugal force for opening and closing said opening.

2. Apparatus as claimed in claim 1 wherein said partition defines a radial cylinder, said valve means including a valve member slidably mounted in said cylinder.

3. Apparatus as claimed in claim 2 wherein said opening establishing communication between said chambers extends laterally through said cylinder.

4. Apparatus as claimed in claim 3 wherein said valve member includes a constricted portion which when it reaches the level of said opening establishes communication between said chambers.

5. Apparatus as claimed in claim 4 wherein said partition is provided with a port establishing communication between said cylinder and the pressure chamber for the direct coupling clutch, said valve member closing said port when said constricted portion reaches the level of said opening.

6. Apparatus as claimed in claim 4 wherein said partition is provided with a port establishing communication between said cylinder and the pressure chamber for the direct coupling clutch, and means in said pressure chamber for the direct coupling clutch for closing said port when the valve means opens said opening.

7. Apparatus as claimed in claim 6 wherein said means for closing said port comprises a resilient leaf spring adjacent said port and normally having a position in which the port is open, said leaf spring being deformed against its own resilience to close said port when the pressure chamber for the direct coupling clutch is supplied with pressure fluid when the valve means opens said opening.

8. Apparatus as claimed in claim 4 wherein said constricted portion normally is radially inwards of said opening, said valve means comprising a spring acting on said valve member urging the same to the normal position thereof.

9. Apparatus as claimed in claim 4 wherein said valve member includes a front portion radially inwards of said constricted portion and a rear portion radially outwards of said constricted portion, said front and rear portions having different diameters.

10. Apparatus as claimed in claim 4 wherein said constricted portion normally is radially inwards of said opening, said valve means comprising a spring acting on said valve member urging the same to the normal position thereof, the rear portion having a larger diameter than the front portion whereby the pressure fluid in said constricted portion applies a force on the valve member opposing the action of the spring whereby the valve means will close said opening when the output shaft is at a lower speed than that at which said opening is opened.